(12) United States Patent
Dusseaux

(10) Patent No.: US 8,790,101 B2
(45) Date of Patent: Jul. 29, 2014

(54) THIN PLATE FOR A LINING OF A MOULD INTENDED FOR VULCANIZING A TIRE TREAD

(75) Inventor: Jean-Raymond Dusseaux, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/704,932

(22) PCT Filed: Jun. 24, 2011

(86) PCT No.: PCT/EP2011/060633
§ 371 (c)(1),
(2), (4) Date: Feb. 8, 2013

(87) PCT Pub. No.: WO2011/161248
PCT Pub. Date: Dec. 29, 2011

(65) Prior Publication Data
US 2013/0164401 A1     Jun. 27, 2013

(30) Foreign Application Priority Data
Jun. 25, 2010  (FR) ...................................... 10 55072

(51) Int. Cl.
*B29D 30/06*     (2006.01)
(52) U.S. Cl.
USPC .............................. 425/28.1; 425/46; 425/470
(58) Field of Classification Search
USPC ............................. 425/28.1, 35, 470, 472, 46
See application file for complete search history.

(56) References Cited

U.S. PATENT DOCUMENTS

| | | | | | |
|---|---|---|---|---|---|
| 2,224,337 | A | * | 12/1940 | Bostwick | 29/515 |
| 2,736,924 | A | * | 3/1956 | Bean | 425/28.1 |
| 2,896,281 | A | * | 7/1959 | Miller et al. | 164/10 |
| 2,983,005 | A | * | 5/1961 | Spier | 164/10 |
| 3,415,923 | A | * | 12/1968 | Petersen | 164/10 |
| 3,553,790 | A | * | 1/1971 | Brobeck et al. | 425/35 |
| 4,553,918 | A | * | 11/1985 | Yoda et al. | 425/46 |
| 6,264,453 | B1 | | 7/2001 | Jacobs et al. | |
| 6,896,503 | B1 | * | 5/2005 | Pinkawa et al. | 425/28.1 |
| 7,384,252 | B2 | * | 6/2008 | Iwamoto et al. | 425/28.1 |
| 8,127,811 | B2 | * | 3/2012 | Ohara | 425/28.1 |
| 8,215,939 | B2 | * | 7/2012 | Takagi et al. | 425/28.1 |
| 2001/0048182 | A1 | * | 12/2001 | Caretta et al. | 425/28.1 |

FOREIGN PATENT DOCUMENTS

EP     0 558 870 A1     9/1993
EP     0 868 955 A1    10/1998

OTHER PUBLICATIONS

International Search Report (PCT/ISA/210) issued on Nov. 3, 2011, by the European Patent Office as the International Searching Authority for International Application No. PCT/EP2011/060633.

* cited by examiner

*Primary Examiner* — James Mackey
(74) *Attorney, Agent, or Firm* — Dickinson Wright PLLC

(57) ABSTRACT

A blade for a lining of a mold intended for vulcanizing a tire tread, the blade being produced by selective laser melting. The blade includes an anchoring part configured to anchor the blade in a body of the lining, a molding part configured to mold at least one cut in the tread of the tire. The blade further includes reinforcement, wholly present in the anchoring part of the said blade.

9 Claims, 3 Drawing Sheets

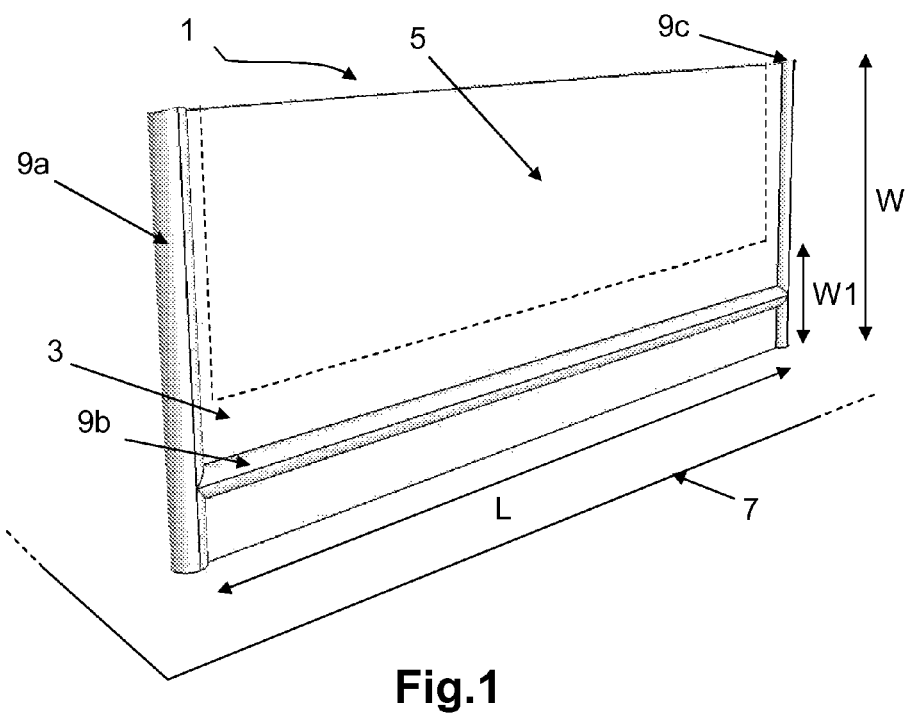
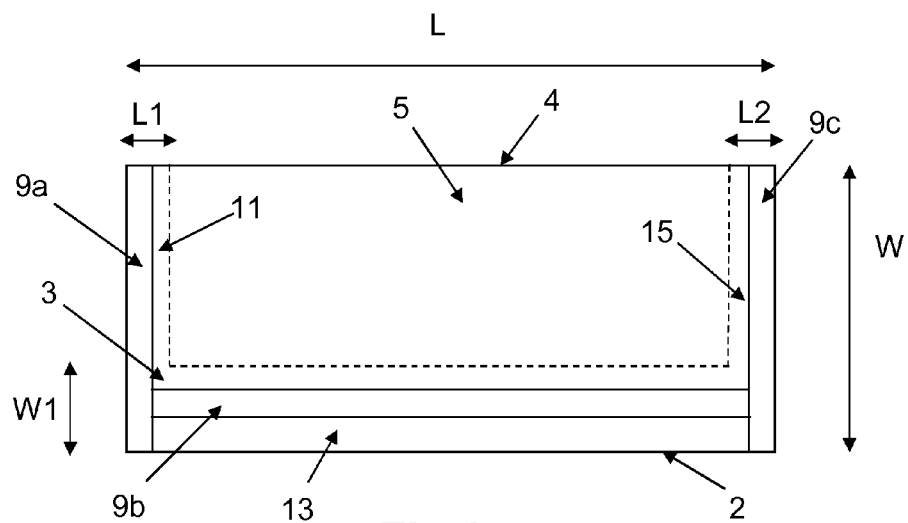

THIN PLATE FOR A LINING OF A MOULD INTENDED FOR VULCANIZING A TIRE TREAD

FIELD OF THE INVENTION

The present invention relates to a lining blade for a mould for vulcanizing a tire.

PRIOR ART

Document EP0868955 discloses a method of producing mould parts using the technique known as selective laser melting, in which lining elements, such as blades, are produced by selective melting of a powder made up of grains, using a laser beam. This method makes it possible to build up blades by superposing layers of grains which are agglomerated using the laser beam.

One benefit of this technique is that the shape of the blade can be modelled by a computer. The laser can thus be driven by the computer so that the successive layers are built up selectively in accordance with the dimensions of the modelled blade.

The blade is built up from a platen the surface of which is generally planar. This platen acts as a base onto which to build up the blade in successive layers.

The first layer of agglomerated grains is formed directly on the platen. Because of the use of the laser melting technique, this first layer is welded to the platen. The other layers of agglomerated grains are then formed in succession on the first layer.

Once the blade has been formed, it needs to be detached from the platen. This detaching operation is generally performed by rapid cutting using a wire.

However, detaching the blade from the platen may cause the said blade to deform. This is because each time a layer of grains agglomerated by laser melting is formed, specific mechanical stresses are created between the said layer and the layer formed beforehand. When the blade is detached from the platen, the mechanical stresses existing between the layers alter and may cause the blade to deform. For example, when the blade is in the form of a thin plate, this plate may curve along its length and/or its width, once it has been detached from the platen. The impression left on the tire by a blade that has become deformed may then not correspond to the desired tread pattern for the tire.

There is therefore a need to guarantee that the blades will maintain their shape even after they have been detached from the platen on which they have been produced by selective laser melting.

The invention thus relates to a blade for a lining of a mould intended for vulcanizing a tire tread, the said blade being produced by selective laser melting, the said blade comprising an anchoring part configured to anchor the blade in a body of the lining, a moulding part configured to mould at least one cut in the tread of the tire. The blade comprises reinforcing means wholly present in the anchoring part of the said blade.

The blade thus comprises a moulding part and an anchoring part.

The anchoring part is intended to hold the blade in the lining.

The moulding part is intended to mould one or more cuts on the tread of a tire.

A cut means either a groove or a sipe (incision).

A groove is a cut the material faces of which do not touch under normal running conditions. In general, the width of a groove is greater than or equal to 2 mm.

A sipe is a cut the material faces of which touch under normal running conditions. In general, the width of a sipe is less than 2 mm.

The lining is a part or collection of parts of the mould which will mould all of the tread of the tire. The lining thus comprises a lining body defining a cavity corresponding to the shape of the tire that is to be vulcanized, and a plurality of blades connected to the lining body.

The expression "present only in the anchoring part" is to be understood as meaning that the reinforcing means do not extend over the moulding part of the blade.

Thus, as the anchoring part of the blade is embedded in the body of the lining, the reinforcing means present only in the anchoring part will not alter the shape of the cut which is moulded only by the moulding part of the blade.

The invention thus makes it possible to reinforce the blade without altering the shape of the impression that the said blade is able to mould in a tread of a tire.

For preference, the reinforcing means take the form of at least one increase in thickness formed as one with the anchoring part of the blade.

The reinforcing means are produced with the blade by selective laser melting. This is thus a simple and practical way of producing the said reinforcing means.

For preference, the blade exhibits a rectangular overall shape and the increase in thickness runs along the length of the said blade.

This then prevents deformations along the length of the blade.

Additionally or alternatively, the blade exhibits a rectangular overall shape and the increase in thickness runs along the width of the said blade.

This then prevents deformations along the width of the blade.

The blade may also comprise a body of rectangular overall shape and a head formed as one with the said body.

Blades of such a shape exhibit greater risks of deforming when detached from the platen. The invention therefore finds a particularly advantageous application with this type of blade.

For preference, the reinforcing means are also anchoring means intended to anchor the blade in the lining body.

The reinforcing means may make it easier for the blade to be anchored in the lining body. The blade is then anchored in the lining body without the need to provide additional anchoring means.

The invention also relates to a lining comprising a lining body and at least one blade as described hereinabove, the said blade being anchored in the said lining body.

The invention also relates to a mould for vulcanizing a tire comprising a lining as described hereinabove.

BRIEF DESCRIPTION OF THE DRAWINGS

Further features and advantages of the invention will become apparent from the following description, given by way of nonlimiting example, with reference to the attached drawings in which:

FIG. 1 is a schematic perspective view of a blade according to a first embodiment of the invention;

FIG. 2 is a side view of the blade of FIG. 1;

Figure 3:
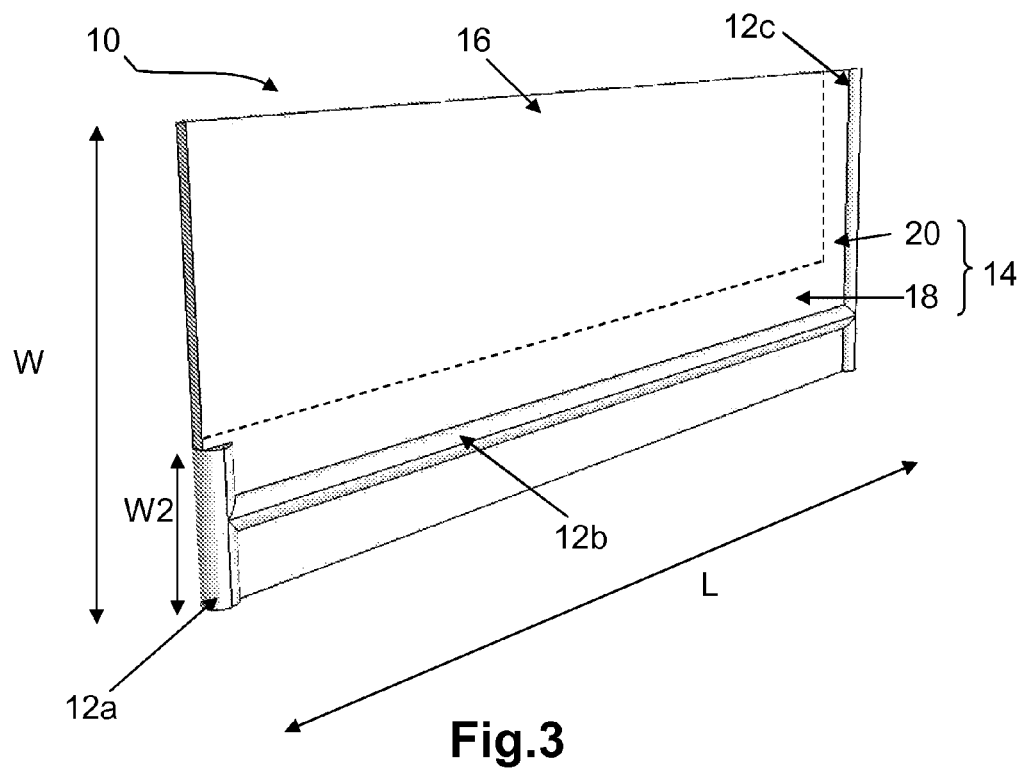
FIG. 3 is a schematic perspective view of a blade according to a second embodiment of the invention.

In the description which will follow, elements that are substantially identical or similar will be denoted by the same references.

FIG. 1 is a perspective view of a blade 1 according to a first embodiment of the invention.

The blade 1 here exhibits a rectangular overall shape of length L and of width W.

In an alternative form of embodiment, the blade may exhibit any other shape, such as a wavy shape.

In the example of FIG. 1, the blade 1 exhibits a substantially constant thickness. The thickness of the blade 1 is, for example, of the order of 0.4 mm. The blade 1 can thus be used to mould a sipe in a tire tread. A sipe is a cut the material faces of which touch under the normal running conditions of a tire.

In an alternative form of embodiment, the thickness of the blade 1 can vary along the length L and/or the width W of the said blade 1.

The blade 1 comprises an anchoring part configured to anchor the blade 1 in a body of a lining of a mould intended for vulcanizing the tread of the tire. The anchoring part comprises a first anchoring surface 3 running along a first face of the blade 1 and a second anchoring surface (not visible in FIG. 1) running along a second face of the blade. The first anchoring surface 3 here has a U-shape.

The blade 1 also comprises a moulding part configured to mould a sipe in the tread of the tire. The moulding part comprises a first moulding surface 5 running along the first face of the blade 1 and a second moulding surface (not visible in FIG. 1) running along the second face of the blade. The first moulding surface 5 here is of rectangular overall shape.

The blade 1 is obtained by selective melting of a powder made up of grains, using a laser beam. This method is also known as laser sintering.

The powder used in the selective melting method is preferably a metallic powder. Thus, the blade 1 can be made of steel.

In an alternative form of embodiment, the powder is a ceramic powder.

In the selective melting method, the blade 1 is built up by superposing layers of grains which are agglomerated using the laser beam. The blade 1 thus exhibits the form of a stratified element.

Agglomerated means that the grains of the powder are joined or welded together. Thus, during the selective melting, connection regions, known as grain boundaries form initially between adjacent grains. Next, the space between the adjacent grains is filled through phenomena of diffusion and plastic flow.

Production of the N-layer blade 1 involves various steps, N being a whole number greater than 1.

In a first step, the powder made up of grains is disposed on a platen 7.

In a second step, a laser beam is used selectively to melt the powder in order to agglomerate all or some of the grains and form a first layer of agglomerated grains.

The first step and the second step are repeated N−1 times to form the blade 1 by superposition of N layers of agglomerated grains.

The first layer of agglomerated grains is welded to the platen 7. Once formed, the blade 1 is then detached from the platen 7, for example by cutting using a wire.

To avoid any deformation of the blade 1 as the said blade 1 is detached from the platen 7, the invention provides reinforcing means 9a, 9b, 9c on the blade 1.

The reinforcing means here exhibit the form of increases in thickness formed as one with the anchoring part of the blade 1. Increases in thickness should be understood as meaning additional material by comparison with the thickness of the blade 1.

More particularly, the reinforcing means comprise a first increase in thickness 9a, a second increase in thickness 9b, and a third increase in thickness 9c, running along the first face of the blade 1.

The first increase in thickness 9a runs along the entire width W of the blade 1.

The second increase in thickness 9b runs partially along the length L of the blade 1 perpendicular to the first increase in thickness 9a.

The third increase in thickness 9c runs along the entire width W of the blade 1 parallel to the first increase in thickness 9a.

The first increase in thickness 9a, the second increase in thickness 9b, the third increase in thickness 9c are formed as one with the first anchoring surface 3 of the blade 1. These increases in thickness are formed with the blade 1 by superposing layers of agglomerated grains during the selective melting process.

The first increase in thickness 9a and the third increase in thickness 9c make it possible to prevent the blade 1 from deforming along the width W of the said blade 1.

The second increase in thickness 9b makes it possible to prevent the blade 1 from deforming along the length L of the said blade 1.

The first increase in thickness 9a, the second increase in thickness 9b, the third increase in thickness 9c here exhibit a cross section shaped as half a disc.

In an alternative form of embodiment, the cross sections of the first increase in thickness 9a, of the second increase in thickness 9b, of the third increase in thickness 9c may be triangular or diamond-shaped.

All combinations of shape of cross section between the various increases in thickness 9a, 9b, 9c are possible.

It will be noted that the second face of the blade 1 may also exhibit increases in thickness (not depicted). The increases in thickness of the second face of the blade 1 may be the complement of the first increase in thickness 9a, of the second increase in thickness 9b, of the third increase in thickness 9c. For example, the increases in thickness of the second face of the blade 1 may be symmetrical with the increases in thickness 9a, 9b, 9c of the first face of the blade 1.

FIG. 2 shows a front view of the blade 1 comprising the first face of the said blade 1.

FIG. 2 shows the arrangement of the first anchoring surface 3 and of the first moulding surface 5 on the blade 1 in greater detail.

The first anchoring surface 3 exhibits an overall U-shape comprising a first branch 11, a base 13 and a second branch 15.

The first branch 11 is of rectangular overall shape with a width corresponding to a first dimension L1.

The second branch 15 is of rectangular overall shape with a width corresponding to a second dimension L2.

The base 13 is of rectangular overall shape with a width corresponding to a third dimension W1.

The first moulding surface 5 exhibits a rectangular overall shape with a width corresponding to the difference between the width W of the blade and the third dimension W1, and with a length corresponding to the difference between the length of the blade L and the sum of the first dimension L1 with the second dimension L2.

The first dimension L1 and the second dimension L2 are determined such that: $L1+L2 \leq \frac{1}{2} \times L$.

In a preferred embodiment, the first dimension L1 and the second dimension L2 are equal.

For preference, the third dimension W1 is determined such that: $W1 \leq \frac{1}{2} \times W$.

It will be noted that the first increase in thickness 9a and the third increase in thickness 9c are located as close as possible to a respective edge of the blade 1.

It will also be noted that the second increase in thickness 9b is located near a lower edge 2 of the blade 1 so as to limit the deformations of the said blade 1 when it is detached from the platen on which the said blade has been formed. However, there is enough space between the second increase in thickness 9b and the lower edge 2 to allow a cutting tool, such as a wire, to pass in order to detach the blade from the platen.

As has already been specified, the blade 1 is detached from the platen during a detaching operation. Once detached, in a way known per se, the blade is placed in an element made of flexible material, for example a material based on an elastomer of silastene type. Plaster is then poured around the element made of flexible material in order to form a plaster mould form. After drying, the element made of flexible material is removed and the blade 1 is held in the plaster mould form in such a way that the anchoring part of the blade 1 is visible. Aluminium is then poured around the plaster mould form to form a lining element. The aluminium comes into contact with the blade in the anchoring part of the said blade to anchor the said blade in the lining element.

In a preferred embodiment of the invention, the reinforcing means are configured in such a way as to encourage the anchoring of the blade in the lining element. For that, the reinforcing means may exhibit a cross section shaped as half a disc with a radius that is large enough to increase the area of contact between the reinforcing means and the aluminium of the lining element.

FIG. 3 is a schematic perspective view of a blade 10 according to a second embodiment.

The blade 10 here exhibits a rectangular overall shape with a length L and width W.

More particularly, the blade 10 comprises an anchoring part configured to anchor the blade 10 in a body of a lining of a mould intended for vulcanizing the tread of the tire. The anchoring part comprises a first anchoring surface 14 running along a first face of the blade 10 and a second anchoring surface (not depicted in FIG. 3) running along a second face of the blade. The first anchoring surface 14 here has an L-shape having a base 18 and a branch 20.

The blade 10 also comprises a moulding part configured to mould a sipe in the tread of the tire. The moulding part comprises a first moulding surface 16 running along the first face of the blade 10 and a second moulding surface (not depicted in FIG. 3) running along the second face of the blade. The first moulding surface 16 is of rectangular overall shape.

The blade 10 further comprises a first increase in thickness 12a, a second increase in thickness 12b and a third increase in thickness 12c running along the first face of the blade 1.

The first increase in thickness 12a runs partially along the width W of the blade 10. The length of the first increase in thickness 12a corresponds to a fourth dimension W2. For preference, the fourth dimension W2 is determined such that $W2 \leq \frac{1}{2} \times W$.

The second increase in thickness 12b runs partially along the length L of the blade 1 perpendicular to the first increase in thickness 12a.

The third increase in thickness 12c runs along the entire width W of the blade 1 parallel to the first increase in thickness 12a.

The first increase in thickness 12a, the second increase in thickness 12b, the third increase in thickness 12c are formed as one with the first anchoring surface 14 of the blade 10.

Figure 4:
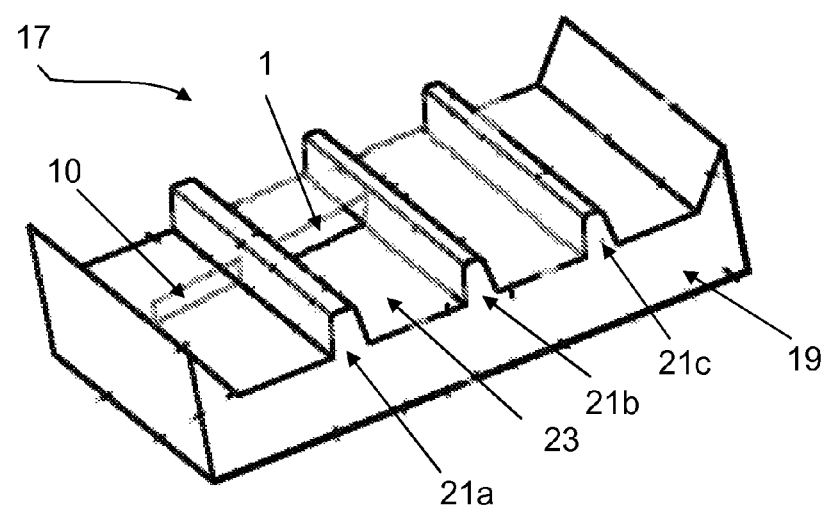
FIG. 4 is a schematic perspective view of a lining element with a blade according to FIG. 1 and a blade according to FIG. 3.

FIG. 4 depicts a lining element 17 comprising a lining body 19.

The lining body 19 comprises a first rib 21a, a second rib 21b and a third rib 21c projecting from a lining bottom 23.

The ribs 21a, 21b, 21c are designed to form grooves in the tread of a tire.

The lining element 17 also comprises a first blade 1 according to the first embodiment of FIG. 1 and a second blade 10 according to the second embodiment of FIG. 3.

The first blade 1 and the second blade 10 are anchored in the lining body 19 using the method described hereinabove.

Thus, the first blade 1 is anchored in the first rib 21a via the first branch 11 of the first anchoring surface 3, with reference to FIG. 1. The first blade 1 is also anchored in the lining bottom 23 via the base 13. Finally, the first blade 1 is anchored in the second rib 21b via the second branch 15 of the first anchoring surface 3.

The second blade 10 is anchored in the first rib 21a via the branch 20 of the first anchoring surface 14, with reference to FIG. 3. The second blade 1 is also anchored in the lining bottom 23 via the base 18 of the first anchoring surface 14. The second blade 10 is not in this instance anchored in a second rib.

The choice of using first blades and/or second blades depends on the number of ribs present and therefore on the tread pattern desired for the tread of the tire.

Figure 5:
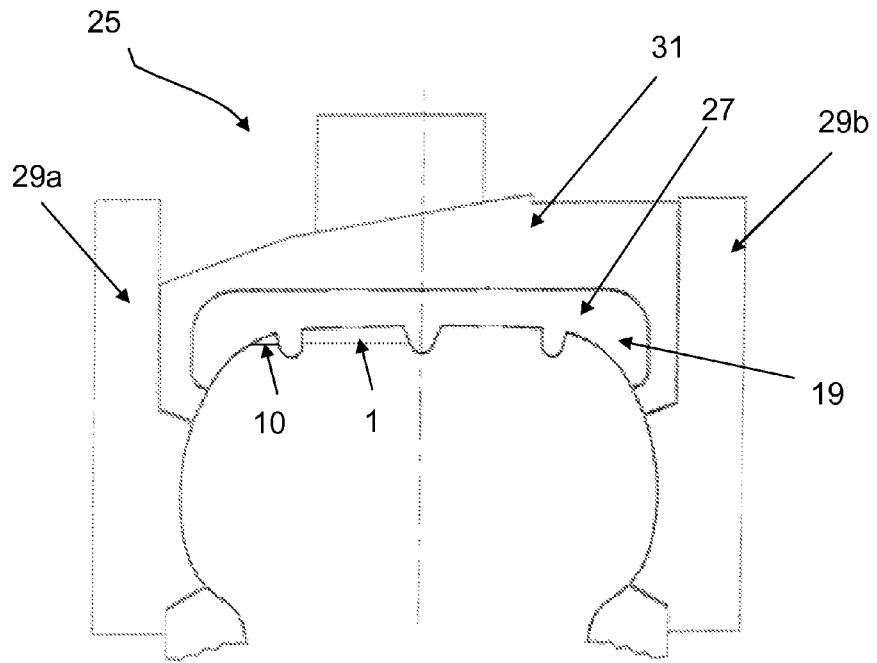
FIG. 5 is a partial view in cross section of a mould for vulcanizing a tire comprising a lining element according to FIG. 4.

FIG. 5 is a view in cross section of a mould 25 for vulcanizing a tire comprising a lining 27. The lining is formed of a plurality of lining elements according to FIG. 4.

The mould 25 also comprises two shells 29a, 29b and segments 31. Just one segment 31 is depicted in FIG. 5.

The two shells 29a, 29b and the segments 31 form a peripheral annulus.

The mould 25 is depicted here in a closed position. In this position, the mould 25 delimits a toroidal cavity the shape of which corresponds to the shape of a tire that is to be moulded.

Figure 6:
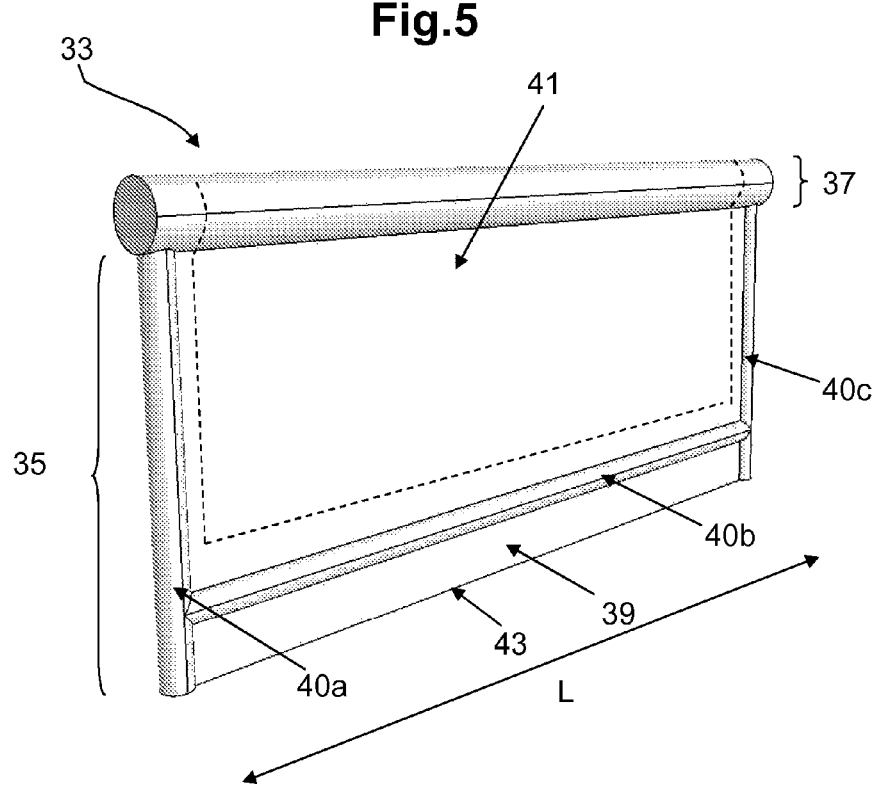
FIG. 6 is a schematic perspective view of a blade according to a third embodiment of the invention.

FIG. 6 is a schematic perspective view of a blade 33 according to a third embodiment of the invention.

In this third embodiment, the blade 33 comprises a body 35 of rectangular overall shape and a head 37 formed as one with the said body 35. The head 37 runs parallel to the length L of the body 35.

The head 37 here is of cylindrical overall shape with a circular cross section.

As an alternative, the cross section of the head may be any other shape, such as a V-shape or U-shape.

The head 37 is formed as one with the body 35.

The blade 33 is thus able to mould a cut of teardrop type in the tread.

The blade 33 comprises an anchoring part 39 configured to anchor the blade 33 in a body of a lining of the mould of FIG. 5.

The blade 33 also comprises a moulding part 41 configured to mould a sipe in the tread of the tire.

The blade 33 also comprises reinforcing means 40a, 40b, 40c.

The reinforcing means 40a, 40b, 40c are positioned in the anchoring part of the blade 33. More specifically, the reinforcing means 40a, 40b, 40c are formed as one with the body 35 of the blade 33.

The body 35 of the blade 33 exhibits an edge 43 formed when the blade 33 is detached from a platen.

The edge 43 is at the opposite end of the blade 33 to the head 37.

Because of the distance between the edge 43 and the head 37, there is a risk that the blade 33 will deform more when it is detached from the platen. The use of the reinforcing means 40a, 40b, 40c is therefore particularly advantageous for this type of blade 33 in order to limit the deformations of the said blade 33.

The invention claimed is:

1. A blade for a lining of a mould intended for vulcanizing a tire tread, the blade comprising:
   a first surface, extending over a length and a width of the blade;
   a second surface, opposing the first surface and extending over a length and width of the blade;
   an anchoring part configured to anchor the blade in a body of the lining and including at least a part of the first surface of the blade;
   a moulding part configured to mould at least one cut in the tread of the tire and including at least a part of the first surface of the blade;
   a reinforcement disposed on at least the first surface, and disposed only in the anchoring part of the blade, comprising:
      a first increase in thickness, a second increase in thickness, and optionally a third increase in thickness, each formed as one with the anchoring part of the blade, at least one of which extends wholly or partially along the length of the blade and at least one of which extends wholly or partially along the width of the blade;
   wherein the blade is produced by selective laser melting, and
   wherein the first increase in thickness, the second increase in thickness, and optionally the third increase in thickness make it possible to prevent the blade from deforming in the direction of the length of the increase in thickness.

2. The blade according to claim 1, wherein the blade is of rectangular overall shape and the first increase in thickness extends along the length of the blade.

3. The blade according to claim 1, wherein the blade is of rectangular overall shape and the first increase in thickness extends along the width of the blade.

4. The blade according to claim 1, wherein the blade comprises a body of rectangular overall shape and a head formed as one with the body.

5. The blade according to claim 1, wherein the reinforcement is also an anchor for anchoring the blade in the lining body.

6. The blade according to claim 1, wherein the blade is of overall rectangular shape and the first increase in thickness extends wholly or partially along the length of the blade, and the second increase in thickness extends wholly or partially along the width of the blade.

7. The blade according to claim 6, wherein the third increase in thickness extends wholly or partially along the width of the blade.

8. A lining of a mould for vulcanizing a tire, comprising a lining body and at least one blade according to claim 1, wherein the blade is anchored in the lining body.

9. A mould for vulcanizing a tire, comprising a lining according to claim 8.

* * * * *